United States Patent [19]

Aerne

[11] 4,255,114

[45] Mar. 10, 1981

[54] OIL BURNER COMBUSTION PROCESS

[76] Inventor: Fred Aerne, CH-9620 Lichtensteig, Switzerland

[21] Appl. No.: 919,183

[22] Filed: Jun. 26, 1978

[30] Foreign Application Priority Data

Apr. 19, 1978 [CH] Switzerland .......................... 4173/78

[51] Int. Cl.$^3$ ............................................. F23D 21/00
[52] U.S. Cl. .......................................................... 431/2
[58] Field of Search ...................... 431/8, 10, 12, 265, 431/248, 2, 4, ; 239/428, 429, 430, 431

[56] References Cited

U.S. PATENT DOCUMENTS

| | | | |
|---|---|---|---|
| 1,279,315 | 9/1918 | Foerst | 239/428 |
| 2,416,161 | 2/1947 | Deck | 431/4 |
| 2,879,948 | 3/1959 | Seibel | 239/428 |
| 2,980,171 | 4/1961 | Furczyk et al. | 431/348 |
| 3,610,537 | 10/1971 | Nishinomiya et al. | 239/429 |

*Primary Examiner*—Carroll B. Dority, Jr.
*Attorney, Agent, or Firm*—Pollock, Vande Sande and Priddy

[57] ABSTRACT

This invention relates to a process for increasing the combustion effect in an oil burner.

According to the process, a mixture of oil, atmospheric air, and added oxygen is projected through a jet into the combustion chamber of the oil burner at a pressure several times greater than 0.5 atmospheres, the outflow aperture of the jet having a diameter which is in the region of 1/10 to 2/10 mm.

Because of the high pressure, a stream which is power-charged and enriched with considerable oxygen and by which combustion is advantageously influenced and oil consumption reduced, leaves the jet. Atomization is advantageously effected at a pressure of 2 atmospheres.

1 Claim, No Drawings

OIL BURNER COMBUSTION PROCESS

BACKGROUND OF THE INVENTION

1. Field of the Invention

This invention relates to a process for increasing the combustion effect in an oil burner.

2. Description of the Prior Art

Atomization of oil-air mixture which is fed to an oil burner has taken place up to now at a pressure of approximately 0.5 atmospheres. Oil consumption is, however, incomplete, which is attributable to insufficient interspersing with oxygen of the atomized fuel which is produced. With present-day high oil prices and with problematical oil supply being prophesied in the future, better oil combustion is of great economic significance.

SUMMARY OF THE INVENTION

The present invention provides a process for increasing the combustion effect in an oil burner. In the process oil-air mixture, at a pressure which is several times greater than 0.5 atmospheres, is projected with additional oxygen supply through the jet of the oil burner into the combustion chamber in a power-charged stream.

Preferably the oil, mixed with atmospheric air, which is fed to the oil burner is projected from one jet of the oil burner at a pressure of 2 atmospheres and the diameter of the outflow aperture of the jet is 1/10 to 2/10 mm.

The pressure is therefore four times greater than the normal accepted one of 0.5 atmospheres. The supply of atmospheric air is effected by a normal suction or force pump, which is simply provided with a higher speed and power. The greater power demand which is essential for operating the pump is amply compensated by the improved combustion effect of the oil burner.

DESCRIPTION OF THE PREFERRED EMBODIMENT

At a pressure of 2 atmospheres, the oil which is mixed with atmospheric air and to which additional oxygen is fed through a special pipeline, escapes in a power-charged stream with a considerable excess of oxygen from the jet and thereby produces a far better and larger-area distribution of the oil-air mixture in the combustion chamber of the oil burner. According to statements which have been made, oil combustion is almost 100%; at the same time, the drainage of the flue gas is made more advantageous from the point of view of air hygiene, independently of atmospheric conditions. The dust content of the combustion gas and the $SO_2$ content is likewise considerably reduced as a result of the high pressure and the admixture of oxygen.

The oil burner which is used is of a conventional type of construction. The supply of the oil and the atmospheric air through a jet is effected by means of a suction or force pump. The speed of the latter must, however, be increased. The outflow aperture in the jet for the oil-air mixture has been reduced from 0.5 mm, which has been standard up to now, to 1/10 to 2/10 mm.

With tests in practice, it has been ascertained that the combustion and power effect are advantageously influenced in operation at a pressure of approximately 2 atmospheres, and a considerable saving of the oil required is also ensured. The additional costs which result in each case from more solid constructions of the oil burner members and seals are far outweighed by the saving in oil.

I claim:

1. A process for improving the combustion effect in an oil burner, comprising feeding a mixture of oil, atmospheric air, and added substantially pure oxygen through a jet of an oil burner having an orifice diameter of between 1/10 to 2/10 mm., said mixture being fed through said jet at a pressure of substantially 2 atmospheres, and projecting the said mixture from said jet of the oil burner into the combustion chamber of the oil burner in a power-charged combustible stream.

* * * * *